United States Patent Office 3,639,518
Patented Feb. 1, 1972

3,639,518
ANTI-STATIC POLYMER COMPOSITIONS WITH DISCOLORATION SUPPRESSORS
Thomas Ellis Davies, Barry, Glamorgan, and Hubert Brian Hopkins, Swansea, Glamorgan, Wales, assignors to Dow Chemical Company Limited, London, England
No Drawing. Filed Sept. 29, 1967, Ser. No. 671,618
Claims priority, application Great Britain, Oct. 19, 1966, 46,728/66
Int. Cl. C08f 45/56; C09k 3/16
U.S. Cl. 260—880 R
8 Claims

ABSTRACT OF THE DISCLOSURE

An antistatic composition for use with polystyrene, polyolefins and other hydrocarbon polymers comprising an alkanolamide of organic acid and, as discolouration suppressor, an oxide, hydroxide, carbonate, bicarbonate or carboxylate of ammonium or metals such as sodium, potassium, magnesium or calcium.

This invention relates to antistatic agent compositions for polymers, and to polymer compositions containing them.

It is known to reduce the tendency of polyolefins to acquire charges of static electricity by incorporating into the polyolefine from 0.01% to 5% by weight of the polyolefine of an antistatic agent consisting of (i) an N-(hydroxyalkylated) fatty acid amide,
(ii) an alkylene oxide condensate of a fatty acid amide,
(iii) an alkylene oxide condensate of an N-(hydroxylated) fatty acid amide, or
(iv) a mixture of two or more compounds selected from the first three classes, the fatty acid amide containing from 6 to 22 carbon atoms. It is also known to reduce the tendency of polyethylene to accumulate electrostatic charges by the incorporation of an ethanolamide of lauric acid.

It has been found that antistatic agents such as lauric diethanolamide cause discolouration in polystyrene after it has been processed at high temperatures. In unpigmented polystyrene which has been processed at a temperature of about 250° C. or above, an unsatisfactory yellowing of the polystyrene occurs and in white polystyrene which normally contains a small quantity of blue pigment an objectionable light green colouration occurs under the same conditions. Furthermore it has been found that in injection moulding operations where the temperature of molten polymer can attain a temperature of about 300° C. severe discolouration of the resulting mouldings occurs particularly where the molten polymer is held in the barrel of the moulding machine for any length of time.

An object of the present invention is to provide antistatic agent compositions which overcome the disadvantages of the anti-static agents referred to above. A further object is to produce polymer compositions having good anti-static properties and free from a tendency to discolour at processing temperatures.

Accordingly the present invention is an anti-static agent composition comprising an alkanolamide of an organic acid and, as discolouration suppressor, an oxide, hydroxide, carbonate, bicarbonate or carboxylate of ammonium or a Group I-A or Group II-A metal of the Periodic Table according to Mendeleef.

The anti-static agent composition contains an alkanolamide of an organic acid. This acid may be aliphatic or aromatic. Preferably it is an aliphatic acid containing 1 to 30 carbon atoms, e.g. lauric acid. The alkanolamide may be a mono- or di-alkanolamide and is conveniently a mono- or di-ethanolamide. Lauric diethanolamide is the preferred alkanolamide.

The anti-static agent composition also contains, as discolouration suppressor, an oxide, hydroxide, carbonate, bicarbonate or carboxylate of ammonium or a Group I-A or Group II-A metal. The carboxylate may be derived from an aliphatic or aromatic acid, e.g. it may be an acetate, a propionate, a stearate or a benzoate. The ammonium compounds are less preferred through their tendency to decompose to ammonia during processing of any polymer with which the anti-static agent composition may be employed. Such ammonia may cause an irritating atmosphere to process workers in the vicinity. Examples of the discolouration suppressors are the hydroxides, carbonates, bicarbonates and stearates of sodium, potassium, magnesium and calcium, particular examples being potassium hydroxide, calcium hydroxide, sodium stearate, sodium bicarbonate and magnesium carbonate.

The anti-static agent compositions often consist of a solution or dispersion of the discolouration suppressor in the alkanolamide. The components thereof can however be added separately to the polymer with which they are to be used and thus the anti-static compositions are formed in situ.

The anti-static agent composition of the present invention may advantageously be used with thermoplastic polymers such as those obtained by the addition polymerisation and copolymerisation of compounds containing ethylenic unsaturation. Examples of such polymers are the polyolefines such as the homopolymers of ethylene and propylene and the copolymers of ethylene and propylene among themselves or with higher aliphatic α-olefines, and the polymers derived from vinyl aromatic compounds. The anti-static agent compositions are particularly valuable when used with the latter polymers. Examples of these are polystyrene and copolymers of styrene with methyl methacrylate or acrylonitrile, including such polymers when prepared in the presence of or subsequently mixed with rubber reinforcing materials such as for example polybutadiene and rubbery butadiene/styrene copolymers.

In preferred anti-static compositions according to the present invention the ratio of the weight of the discoloration suppressor to that of the alkanolamide lies in the range 1:10 to 1:50.

The alkanolamide in the anti-static agent composition may be present in the thermoplastic polymer over a wide range of concentrations but is preferably present over the range 0.005% to 5% by weight of the polymer with which the composition is to be used. For polyethylene the particularly preferred range is 0.02% to 0.5% by weight, whereas for polystyrene it is 0.9% to 2.5%.

The concentration of the discolouration suppressor can also vary over wide limits but it is preferred to have it present over the range 0.005% to 1.0% by weight of the polymer with which it is used. An unnecessarily high loading of the colour suppressor should be avoided as otherwise the effectiveness of the alkanolamide as an antistatic additive may be impaired.

A polymer compounded with the anti-static agent composition of the present invention may also contain any of the conventional polymer additives for example lubricants, antioxidants, pigments and dyes.

The method of incorporating the anti-static agent composition in a thermoplastic polymer is conveniently carried out by adding the anti-static agent when the polymer is in a molten state. When the anti-static agent composition is to be formed in situ in the polymer with which it is to be used, the discolouration suppressor may be incorporated into the polymer by blending in a mixer or in the barrel of an extruder before, after, or at the same time as the incorporation of the alkanolamide.

The invention is further illustrated by the examples that follow. The effectiveness of the anti-static agent compositions according to the present invention is demonstrated by reference to a control experiment in which polymer containing the alkanolamide in the absence of a discolouration suppressor was used.

CONTROL EXPERIMENT

Lauric diethanolamide was injected into a white, rubber-toughened grade of polystyrene during passage of the polymer through an extruder. The extruded polymer strands, which contained 2.2% by weight of lauric diethanolamide, were cooled and cut into granules. The polystyrene granules to produced were then fed to an injection moulding machine equipped for the moulding of beakers. The barrel temperature of the machine was maintained at 260° C. The machine was thoroughly flushed with the polystyrene moulding material under test. The material was then allowed to remain in the machine for 20 minutes after which interval of time the moulding of beakers was commenced. The first six beakers to be moulded were markedly green in colour.

Example 1

The procedure of the control experiment was followed except that the lauric diethanolamide used contained 0.25% of its weight of dissolved potassium hydroxide. A slight green discolouration was observed in the vicinity of the rims of the moulded beakers but otherwise the beakers were white.

Example 2

The procedure of the control experiment was followed except that the lauric diethanolamide used contained 2.0% of its weight of dissolved potassium hydroxide. The moulded beakers were white.

Example 3

The procedure of the control experiment was followed except that the polystyrene granules were blended with 0.2% by weight of finely powdered sodium bicarbonate before incorporation of the lauric diethanolamide during extrusion. The beaker mouldings subsequently obtained were white.

Example 4

The procedure of control experiment was followed except that the polystyrene granules were blended with 0.2% by weight of finely powdered calcium hydroxide before incorporation of the lauric diethanolamide during extrusion. The beaker mouldings subsequently obtained were white.

Example 5

The procedure of the control experiment was followed except that the polystyrene granules were blended with 0.6% by weight of finely powdered sodium stearate before incorporation of the lauric diethanolamide during extrusion. The beaker mouldings subsequently obtained were white.

Example 6

The procedure of the control experiment was followed except that the polystyrene granules were blended with 0.3% by weight of magnesium carbonate before incorporation of the lauric diethanolamide during extrusion. The beaker mouldings subsequently obtained were white.

We claim:

1. A polymer composition comprising a thermoplastic polymer selected from the group consisting of polyethylene, polypropylene, copolymers of ethylene and propylene with each other or with aliphatic mono-olefins copolymerizable therewith, polystyrene and copolymers of styrene with methyl methacrylate, acrylonitrile, or with a rubbery elastomer selected from the group consisting of polybutadiene and butadiene/styrene copolymers, and, as an antistatic agent, a composition comprising (a) 0.005 to 5% by weight of the polymer composition of an alkanolamide of an organic acid having a hydrocarbon portion containing 1 to 30 carbon atoms, the hydroxy alkyl groups of said alkanolamide containing a total of 2 to 8 carbon atoms and (b) a discoloration suppressor selected from the group consisting of the oxides, hydroxides, carbonates and bicarbonates of ammonium and the Group I-A and Group II-A metals of the periodic Table, with the ratio of the weight of the discoloration suppressor to that of the alkanolamide being in the range of 1:10 to 1:50.

2. A polymer composition comprising a thermoplastic polymer selected from the group consisting of polystyrene and copolymers of styrene with methyl methacrylate, acrylonitrile, or with a rubbery elastomer selected from the group consisting of polybutadiene and butadiene/styrene copolymers, and, as an antistatic agent, a composition comprising (a) 0.5% to 2.5% by weight of the polymer composition of an alkanolamide of an organic acid having a hydrocarbon portion containing 1 to 30 carbon atoms, the hydroxy alkyl groups of said alkanolamide containing a total of 2 to 8 carbon atoms and (b) a discoloration suppressor selected from the group consisting of the hydroxides, carbonates and bicarbonates of the Group I-A metals of the Periodic Table and the oxides, hydroxides, carbonates and bicarbonates of the Group II-A metals of the Periodic Table with the ratio of the weight of the discoloration suppressor to that of the alkanolamide being in the range of 1:10 to 1:50.

3. A polymer composition as claimed in claim 2, wherein the alkanolamide is lauric diethanolamide and the discoloration suppressor is potassium hydroxide.

4. A polymer composition as claimed in claim 2, wherein the alkanolamide is lauric diethanolamide and the discoloration suppressor is sodium bicarbonate.

5. A polymer composition as claimed in claim 2, wherein the alkanolamide is lauric diethanolamide and the discoloration suppressor is calcium hydroxide.

6. A polymer composition as claimed in claim 2, wherein the alkanolamide is lauric diethanolamide and the discoloration suppressor is magnesium carbonate.

7. A polymer composition as claimed in claim 2, wherein the alkanolamide is lauric diethanolamide.

8. A polymer composition comprising a thermoplastic polymer selected from the group consisting of polyethylene, polypropylene and copolymers of ethylene and propylene with each other or with aliphatic mono-olefins copolymerizable therewith, and, as an antisatic agent, a composition comprising (a) 0.02 to 0.5% by weight of the polymer composition of an alkanolamide of an organic acid having a hydrocarbon portion containing 1 to 30 carbon atoms, the hydroxy alkyl groups of said alkanolamide containing a total of 2 to 8 carbon atoms and (b) a discoloration suppressor selected from the group consisting of the oxides, hydroxides, carbonates and bicarbonates of ammonium and the Group I-A and Group II-A metals of the Periodic Table, with the ratio of the weight of the discoloration suppressor to that of the alkanolamide being in the range of 1:10 to 1:50.

References Cited

UNITED STATES PATENTS

| | | | |
|---|---|---|---|
| 2,341,186 | 2/1944 | Matheson et al. | 260—23 |
| 2,462,331 | 2/1949 | Myers | 260—23 |
| 2,485,592 | 10/1949 | Griess et al. | 260—23 |
| 2,956,979 | 10/1960 | Rowland et al. | 260—32.6 |
| 2,985,617 | 5/1961 | Salyer et al. | 260—45.7 |
| 2,991,265 | 7/1961 | Clark et al. | 260—32.6 |
| 3,183,202 | 5/1965 | Baird et al. | 260—32.6 |
| 3,188,298 | 6/1965 | Williamson et al. | 260—45.85 |
| 3,206,429 | 9/1965 | Broyles et al. | 260—45.9 |
| 3,332,912 | 7/1967 | Rochltz et al. | 260—67 |
| 3,371,130 | 2/1968 | Seifert et al. | 260—897 |
| 3,400,116 | 9/1968 | Boeke | 260—94.9 |
| 2,857,341 | 10/1958 | Colwell et al. | 260—2.5 |
| 3,326,840 | 6/1967 | Ross et al. | 260—32.6 |
| 3,365,437 | 1/1968 | Marra et al. | 260—94.9 |

OTHER REFERENCES

Witco Chemical Co., Bulletin 55-4R-5-63, 1965, pp. 15 and 20.

DONALD E. CZAJA, Primary Examiner

R. A. WHITE, Assistant Examiner

U.S. Cl. X.R.

260—45.7 R, 45.9 R, 85.5 S, 86.7, 88.2 S, 93.5 A, 94.9 GD, 892